(12) United States Patent
McIver et al.

(10) Patent No.: US 12,184,784 B2
(45) Date of Patent: Dec. 31, 2024

(54) DETECTION OF ANOMALIES IN A COMPUTER SYSTEM

(71) Applicant: ULedger, Inc., Bainbridge Island, WA (US)

(72) Inventors: Joshua R. McIver, Meridian, ID (US); Taulant Ramabaja, Prishtina (XK); Peter S. Anewalt, Boise, ID (US)

(73) Assignee: ULEDGER, INC., Bainbridge Island, WA (US)

( * ) Notice: Subject to any disclaimer, the term of this patent is extended or adjusted under 35 U.S.C. 154(b) by 77 days.

(21) Appl. No.: 17/827,186

(22) Filed: May 27, 2022

(65) Prior Publication Data

US 2022/0400013 A1    Dec. 15, 2022

Related U.S. Application Data

(63) Continuation of application No. 16/460,800, filed on Jul. 2, 2019, now abandoned.

(Continued)

(51) Int. Cl.
*H04L 9/32* (2006.01)
*G06F 16/23* (2019.01)
(Continued)

(52) U.S. Cl.
CPC ........ *H04L 9/3236* (2013.01); *G06F 16/2365* (2019.01); *G06F 21/552* (2013.01); *G06F 2221/034* (2013.01); *H04L 9/50* (2022.05)

(58) Field of Classification Search
CPC ..... H04L 9/3236; H04L 9/50; G06F 16/2365; G06F 21/552; G06F 2221/034
See application file for complete search history.

(56) References Cited

U.S. PATENT DOCUMENTS 9,774,578 B1   9/2017   Ateniese et al.
9,785,369 B1   10/2017  Ateniese et al.
(Continued)

FOREIGN PATENT DOCUMENTS

| RU | 2510623 C2 | 10/2013 |
| WO | WO-2017/091530 A1 | 6/2017 |
| WO | WO-2019/051429 A1 | 3/2019 |

OTHER PUBLICATIONS

"Blockrope—Internal Parrallel Intertwined Blockchains—scaleability related." In bitcointalk Bitcoin Forum [online]. Jun. 1, 2015 [retrieved on Aug. 15, 2024]. Retrieved from the Internet: https://bitcointalk.org/index.php?topic=1060430.0 (Year: 2015).*

(Continued)

*Primary Examiner* — Catherine Thiaw
*Assistant Examiner* — Zhe Liu
(74) *Attorney, Agent, or Firm* — Foley & Lardner LLP

(57) ABSTRACT

Systems and methods of detecting anomalies in a computing system are disclosed. The computing system can be a member of a blockchain network of a plurality of blockchains. Digests of blocks may be passed between blockchains of the plurality of blockchains, which enables each member of the blockchain network to verify an immutable record of data transactions, free of the mutual trust requirement of a typical blockchain environment. The passing of blockchain block digests further enables a member of the blockchain network to assist another member of the blockchain network to identify an anomaly within moments of when the anomaly first occurs.

20 Claims, 5 Drawing Sheets

Related U.S. Application Data

(60) Provisional application No. 62/693,870, filed on Jul. 3, 2018.

(51) Int. Cl.
*G06F 21/55* (2013.01)
*H04L 9/00* (2022.01)

(56) References Cited

U.S. PATENT DOCUMENTS

| | | | |
|---|---|---|---|
| 9,959,065 B2 | 5/2018 | Ateniese et al. | |
| 9,967,088 B2 | 5/2018 | Ateniese et al. | |
| 10,013,573 B2 | 7/2018 | Dillenberger | |
| 10,110,576 B2 | 10/2018 | Ateniese et al. | |
| 10,326,802 B1 | 6/2019 | Irwan et al. | |
| 10,367,645 B2 | 7/2019 | Dechu et al. | |
| 10,523,443 B1 | 12/2019 | Kleinman | |
| 10,599,874 B2 | 3/2020 | Brady et al. | |
| 10,700,852 B2 | 6/2020 | Xie et al. | |
| 10,715,531 B2 | 7/2020 | Thekadath et al. | |
| 10,803,022 B2 | 10/2020 | Ramabaja | |
| 11,139,979 B2 | 10/2021 | Van De Ruit et al. | |
| 11,153,097 B1 | 10/2021 | Griffin | |
| 11,323,457 B2 | 5/2022 | Thekadath et al. | |
| 11,334,856 B2 | 5/2022 | Vukich et al. | |
| 11,405,183 B2 | 8/2022 | Singh et al. | |
| 11,469,886 B2 | 10/2022 | Padmanabhan | |
| 11,522,670 B2 | 12/2022 | Gulati et al. | |
| 11,580,075 B2 | 2/2023 | Ramabaja | |
| 11,636,470 B2 | 4/2023 | Agrawal et al. | |
| 2009/0016534 A1 | 1/2009 | Ortiz Cornet et al. | |
| 2014/0298034 A1 | 10/2014 | Watanabe et al. | |
| 2015/0207790 A1 | 7/2015 | Lu et al. | |
| 2016/0330034 A1* | 11/2016 | Back | G06Q 20/065 |
| 2017/0005804 A1 | 1/2017 | Zinder | |
| 2017/0163733 A1 | 6/2017 | Grefen et al. | |
| 2017/0195406 A1 | 7/2017 | Zhang et al. | |
| 2017/0243193 A1 | 8/2017 | Manian et al. | |
| 2018/0013567 A1* | 1/2018 | Davis | H04L 63/126 |
| 2018/0165476 A1* | 6/2018 | Carey | H04L 9/3247 |
| 2018/0183601 A1* | 6/2018 | Campagna | G06F 21/602 |
| 2018/0332072 A1* | 11/2018 | Ford | H04L 9/3236 |
| 2019/0020629 A1 | 1/2019 | Baird et al. | |
| 2019/0079950 A1 | 3/2019 | Ramabaja | |
| 2019/0081793 A1* | 3/2019 | Martino | H04L 9/0894 |
| 2019/0236562 A1 | 8/2019 | Padmanabhan | |
| 2019/0253257 A1* | 8/2019 | Yan | G06F 16/235 |
| 2019/0259274 A1* | 8/2019 | Avery | G08G 1/09675 |
| 2019/0305958 A1* | 10/2019 | Qiu | G06Q 20/389 |
| 2019/0327084 A1* | 10/2019 | Oh | H04L 9/0825 |
| 2019/0361992 A1* | 11/2019 | Kaguma | H04L 9/0637 |
| 2019/0379699 A1* | 12/2019 | Katragadda | H04L 63/1425 |
| 2020/0014542 A1 | 1/2020 | McIver et al. | |
| 2020/0112598 A1 | 4/2020 | Petry et al. | |
| 2020/0139984 A1 | 5/2020 | Ronnow et al. | |
| 2020/0402026 A1* | 12/2020 | Furukawa | G06Q 20/401 |

OTHER PUBLICATIONS

"JRFC 20—Merkle DAG", Github, Jun. 20, 2014, https://github.com/jbenel/random-ideas/issues/20.

Apostolaki, et al., "Hijacking Bitcoin: Routing Attacks on Cryptocurrencies", hllps://blc-hijack.elhz.ch/files/bts_hijack.pdf, accessed Oct. 9, 2019.

Back, et al., "Enabling Blockchain Innovations with Pegged Sidechains", https://blockstream.com/sidechains.pdf, Oct. 22, 2014.

Bag, et al., "Bilcoin Block Withholding Attack: Analysis and Mitigation", http://eiiixplire.ieee.org/documenl/7728010/,EEE Xplore Digital Library, vol. 12, Issue 8, Aug. 2017, pp. 1967-1978.

Baquero, et al., "Why Logical Clocks are Easy—Sometimes All You Need is the Right Language", ACMQUEUE, Programming Languages, Apr. 12, 2016, vol. 14, Issue 1, http://queue.acm.org/delail.cfm?id=2917756.

Buterin, "Chain Interoperability", Sep. 9, 2016 {Sep. 9, 2016), XP055511899, retrieved from the Internet: URL: http://www.r3cev.com/s/Chain-Interoperabilily-8g6f.pdf [retrieved on Oct. 2, 2018].

Extended European Search Report dated Jul. 23, 2021 for EP application 18854771.5.

Eyal, et al., "Majority is Nol Enough: Bitcoin Mining is Vunerable", hllps://www.cs.cornell.edu/ie53/publications/btcProcFC.pdf, accessed Oct. 9, 2019.

International Search Report and Written Opinion Dated Nov. 20, 2018 for international application PCT/US2018/050302.

JRFC 20—Merkle DAG, Github, Jun. 20, 2014, https://github.com/jbenet/random-ideas/issues/20.

McConaghy, et al. Bigchaindb: a scalable blockchain database, white paper, BigChainDB (2016) (Year: 2016), 66 pages.

Nakamoto, "Bitcoin: A Peer-to-Peer Electronic Cash System", https://bitcoin.org/bitcoin.pdf, accessed Oct. 9, 2019.

Roughtime, https://roughtime.googlesource.com/roughtime, accessed Oct. 9, 2019.

Sompolinsky, et al., "Secure High-Rate Transaction Processing in Bitcoin", https://eprint.iacr.org/2013/881.pdf.

VVood, "Polkadol: Vision for a Heterogeneous Multi-Chain Framework", Jul. 24, 2017 {Jul. 24, 2017) pp. 1-21, KP055597598, retrieved from the Internet: URL:https://polkadot,nelwork/PolkaDotPaper.pdf [retrieved on Jun. 18, 2019].

* cited by examiner

DETECTION OF ANOMALIES IN A COMPUTER SYSTEM

RELATED APPLICATIONS

This application claims priority to U.S. Provisional Patent Application No. 62/693,870, titled DETECTION OF ANOMALIES IN A COMPUTER SYSTEM, filed Jul. 3, 2018, the entirety of which is incorporated herein by reference.

TECHNICAL FIELD

The present disclosure relates generally to the field of data security, and more particularly to systems and methods of detection of anomalies in a computer system.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

Figure 1:
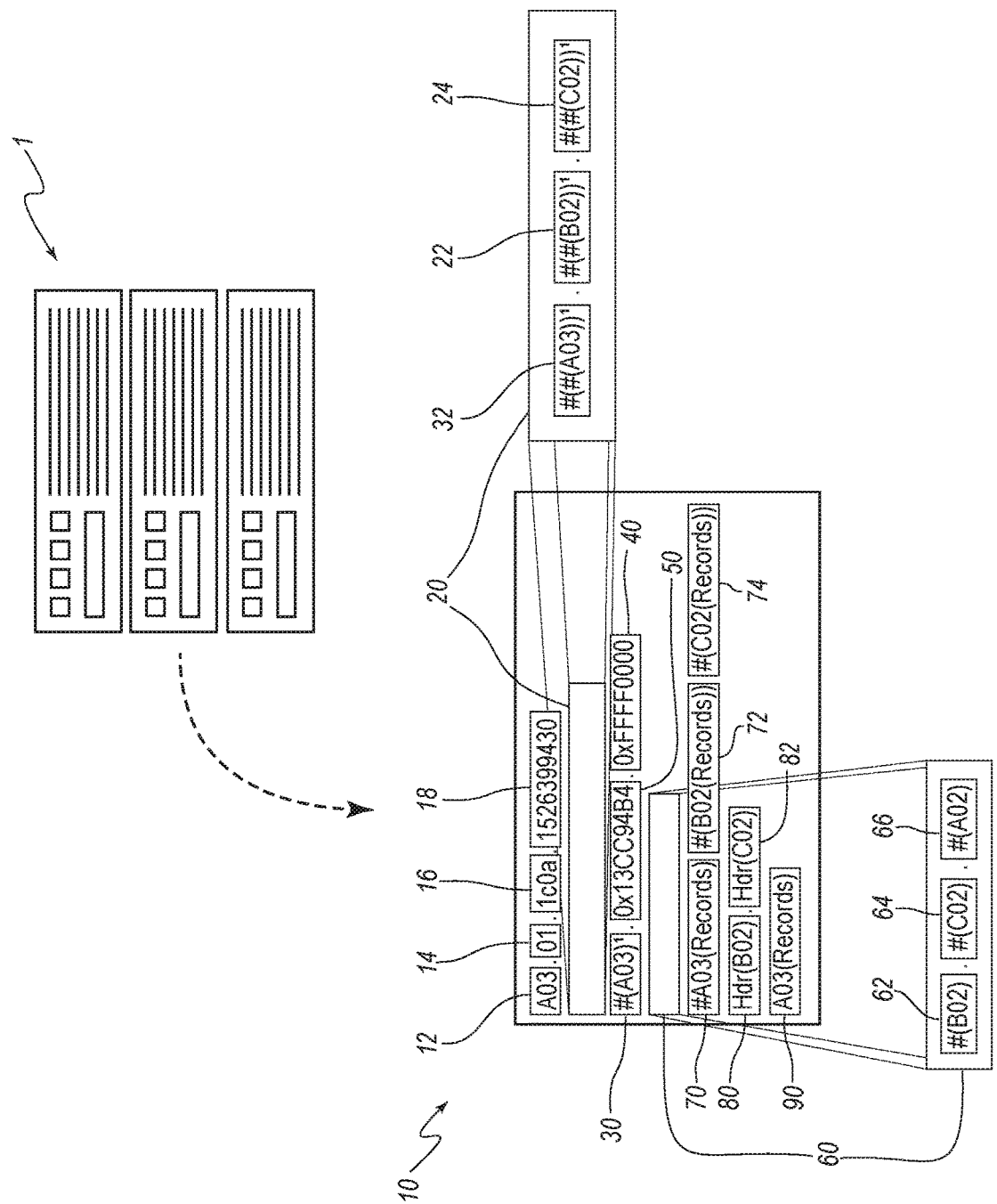
FIG. 1 is a diagram of a block of a blockchain within a computing system according to an embodiment of the present disclosure.

Transactional record keeping, a business practice as old as business, requires at least accuracy, accessibility, security and reliability. Technological advances both respond to and drive these demands. Computer systems (hardware and software) can facilitate, to a degree, accurate, accessible, secure, reliable transactional record keeping. A number of aspects of computer-based transactional record keeping introduce both new advantages and weaknesses over older, traditional, pen-and-book record keeping. For example, computer-based transactional record keeping may be vulnerable to an intruder viewing (and copying) confidential business information such as trading triggers, investment holdings, real estate contracts, and more. Likewise, an intruder may manipulate data, effectively stealing or fraudulently redirecting corporate assets. Or an intruder may hijack a company's computing assets for illicit purposes not directed toward the business itself, such as hiding illegal information and/or services behind a wholly legitimate Internet address and providing access to other malfeasors such that the target computing system is subverted as a "dark web node." These are but a few generalized ways in which computers—including computers hosting transactional record keeping—may be abused to the detriment of the computer's owner or operator, or even a real-world community at large.

Companies undertake a variety of measures to prevent such abuses, to detect them, and to correct them. These practices include efforts ranging from simple to complex. A simple measure is the use of login usernames associated with passwords having a required minimum degree of complexity and stored as a hash behind firewall-protected routers on servers running the latest intrusion detection software. A more complex set of measures may involve username/password pairings on certificate-secured hardware running antivirus software over a dedicated connection through specialized port addresses with anti-packet sniffing technology, noise detection, traffic monitoring in a variety of forms, redundant process and storage, and many more practices.

The degree to which a computer user, in particular, a corporate computer user, expends resources to protect the information stored on a computing system, and the computing system itself may be related to the value of the information stored, the cost of maintaining and/or replacing the system, and the cost of losses (including liability to clients and third-parties) that may be incurred by a failure to protect the information and/or system. An inherent issue with corporate users of computer-based transactional record keeping where the value of the data may require the highest measures of protection, is that the costs of protection includes the cost of added hardware, software, manpower, and computing time (e.g., cost of electricity, cooling, opportunity cost or diversion from other computing tasks, etc.). While these additional measures afford protection, they also introduce new concerns, such as maintenance with minimal loss of operating time, unexpected outages, and even the potential of additional weaknesses for a malfeasor to exploit.

The current model of computer-based transactional record keeping for small businesses involves operating a nominally closed computing system to prevent intrusions by air-gapping the computing system from all external access. That is, the computer handling transactional record keeping is totally isolated from all network-based access. This creates, of course, some costs by requiring all transactions to be manually entered by a person having direct physical access to the computing system. This model may make intrusion highly infeasible as the intruder must gain physical access to the computer directly; however, the model employs no means of detecting or remediating the effect of an unscrupulous employee or repairperson.

Few entities above the level of "small business" can effectively function with a totally closed, air-gapped computer-based transactional record keeping system. A reasonable transaction rate for such businesses makes manual entry of the transactions into an air-gapped computer economically challenging, as the increased volume of transactions requires ever greater expense in isolated hardware, licensing, human interaction, training, maintenance, etc.

For larger entities, a totally air-gapped computer-based transactional record keeping system is simply not feasible. Part of the reason for this is that the nature of transactions changes in larger companies. This is because large companies have increasing volumes of internal customers—components of the business that execute transactions with other components of the business. As an example, a small company might order a dozen Doodads and a gross of Gizmos, while a large company may order a dozen boxcars of Doodads and a gross of pallets of Gizmos . . . and like quantities of Widgets, Nicknacks, Whatchamacallits, and Thingamajigs. In the former scenario, there is a single point of delivery of exactly 156 items, and the same point of disposition. In the latter, there may be thousands of products in a set of weekly orders, delivered to multiple points for redistribution to regional warehouses for further redistribution to multiple retail units and involving numerous changes in quantity to supply each individual retail unit, plus multiple points of accounting as products logically move from one computer to another. If some or all of these goods are perishables having varying handling requirements (frozen, refrigerated, non-refrigerated; stackable, non-stackable; odd size/shape; etc.), the nature and quantity of transactions to be recorded may grow by orders of magnitude or more.

As the volume of transactional record keeping grows, so does the cost of systems related to intrusion prevention, detection, and remediation. Relatedly, as the volume of intrusion prevention, detection, and remediation mechanisms in a system increases, so does the volume of transactional record keeping. In other words, the increase in transactional data forces an increase in protection, detection, and remediation efforts, which efforts themselves generate more transactions (such as, for example, e.g., system logs and logs of various intrusion prevention and detection applications).

An industry standard for medium and larger companies is to include as a part of the computing system one or more data storage systems, or a network of such systems. Currently, such systems are designed to provide nominally rapid record keeping in an environment of high-capacity storage wherein the data is retained wholly "in house." In other words, large computing systems owned or operated by a company store and process all transactional data within the logical confines of the company's owned or leased computing systems, and may include rapidly scalable, third-party-operated servers (such as, for example, e.g., Amazon Web Services™ or Google Cloud Platform™).

Industry standards provide for a broad approach to protecting data, primarily directed to intrusion prevention. When successful, such intrusion prevention typically detects the attempted intrusion and prevents the unauthorized access, and is usually accompanied by timely automated reporting to cognizant personnel. However, when intrusion prevention is unsuccessful, the intrusion may produce costly effects, and may remain undetected for an extended period of time, during which sensitive company information, private information of customers and employees, and more, may be exposed to a malfeasor.

By way of examples:

In 1999, an intruder was able to access a NASA server and steal the software for controlling life support aboard the International Space Station, resulting in a three (3) week shutdown and costing $41,000 to remediate.

In 2002, an intruder was able to insert code on a server of a major, New York-based news provider to allow the intruder repeated access to perform Lexis-Nexis searches for three (3) months at an estimated cost to the news vendor of $300,000.

In 2013, and again in 2015, servers of a data validation company owned by a credit reporting agency were repeatedly compromised, resulting in the theft of Social Security numbers and other personal data of fifteen (15) million customers.

In 2016, a national (US) grocery chain notified its employees and former employees that the online W2 service provider used by the company had been compromised, exposing tax and salary data for an undisclosed number of employees and former employees.

According to the K-12 Cybersecurity Resource Center (https://k12cybersecure.com), there have been 330 cybersecurity incidents targeting U.S. K-12 public schools since January 2016 (retrieved May 4, 2018).

In 2017, one of the major credit reporting agencies disclosed that its servers were compromised through a previously identified but unrectified exploit. The intrusion was first detected 77 days after the initial break-in, resulting in the theft of personally identifiable information of at least 148 million consumers. The agency was still discovering areas of data stolen nearly a year after the initial intrusion. The agency further disclosed the breach has cost approximately US $243 million, which does not include costs of litigation (several law suits have been filed against the agency as a result of the breach and failure to timely mitigate the reach of the intruder(s)) and downstream costs to the effected consumers and marketplaces.

The foregoing examples are merely representative, and not exhaustive, and does not address undiscovered or undisclosed breaches.

Once sensitive information is compromised, operational intrusion remediation efforts seek to restore the targeted system to nominal functionality; however, any stolen information—whatever its nature—is often irretrievable. The longer an intrusion exposes data to a malfeasor or a group of malfeasors, the more data can be stolen, deleted or altered. The target system may be further compromised during such an intrusion to enable future attacks, or even install hidden processes which may forward target data to the malfeasor(s) without a need for a new intrusion.

The present invention is directed to systems and methods of detecting anomalies in a computer system. An anomaly may accompany or be symptomatic of an attack against the computer system, or an intrusion, including an intrusion occurring in tandem with an otherwise authorized access to the computer system. More particularly, the instant disclosure presents a form of blockchain network operating in a private, semi-private, or public manner such that an anomaly on or within a participating computer-member may be self-detected, or, in some embodiments, detected by another participating member at or near inception and without cross sharing of sensitive information between participating computer-members.

Anomaly refers to a state-change within a computer or computing system outside the expectations of the computer owner/operator. By way of example without limitation, an alteration to a system operating log, an alteration to a computer operating system, unauthorized opening or closing of a communication port, unauthorized access to a service of a computer, unauthorized entry or deletion of information, unauthorized copying of data (within a system, or from an internal system to an external system), modifying firmware/software within a computer or internal network, disabling computer protection software or subsystem(s), etc. An intrusion into a computing system is often accompanied by efforts to mask the intrusion by altering system logs.

Computer refers to an electronic device capable of executing machine-readable instructions; is suitable for storing and/or processing data; and comprises at least a processor, a memory, an input capability, and an output capability. A computer may be a complete computing system, or a component of a computing system. A computer is capable of one or more of the computer functions of receiving data, processing data, storing data, transmitting data, outputting data.

Computing system refers to a computer or a collection of computers and similar devices communicating together to accomplish one or more functions of a computer.

Network refers to a system or method and related equipment of interconnectivity between computing systems, regardless of topology, protocol, operating system, or geophysical location.

Computer operator refers an individual, real person having duties intended to provide for effective operation of one or more computer systems, network systems, data systems; the duties potentially including hardware maintenance, software management, firmware management, and similar functions.

Computer owner refers a person or entity owning a computer or computing system, or a person or entity having an ownership interest (such as renting or purchasing access and CPU time, or leasing a computer/computing system). A computer owner may also be a computer operator.

Intruder refers to a person who either directly or through use of any of a variety of software modules, applications, etc., seeks to gain access to a computer/computing system in a manner or for a purpose other than as intended by the owner/operator of the computer/computing system. A person having legitimate access to a computer may become an intruder by performing or attempting to perform a function not intended by the computer owner/operator.

Intrusion prevention refers to any system or method, typically automated, employed to deny or prevent unauthorized access to a target computer or computing system.

Intrusion detection refers to any system or method, typically automated, employed to identify unauthorized access, attempted or successful, to a computer/computing system.

Intrusion remediation refers to any system or method, which may be automated or partially automated, to terminate an intrusion into a computer/computing system; and may also refer to systems, methods, processes, etc., to negate, overcome, etc., any effect resulting from an intrusion into a computer/computing system. In the former instance, intrusion remediation seeks to identify the means by which an intruder succeeded in accessing the system, terminating the access, and rectifying the weakness which permitted the access. In the latter instance, intrusion remediation may involve a wide range of functions, including restoration of services, recovery of data, identification of damage, accountability to stakeholders, compliance with local or national laws, etc.

Blockchain refers to a system or method wherein data are contained within a logical block, and the various blocks of data are logically organized in a relative time-ordered sequence, and having an element of the data of each block comprising a token identifying and logically connecting the block to the immediately preceding block.

Blockchain network refers to a collection of at least two blockchains which exchange with each other an amount of particular data whereby each blockchain in the blockchain network provides a degree of proof-of-truth and proof-of-work for each other blockchain within the blockchain network. A blockchain network may be implemented through cross-merkelization.

Principal blockchain generally refers to a blockchain operated by a principle; however, within the context of this disclosure, a principal blockchain is an example blockchain discussed herein as if the reader were the principle operating the example blockchain. Further, for the purposes of this disclosure, the example principal blockchain is participating in a blockchain network.

Participating neighbor blockchain refers to a blockchain participating in a blockchain network, exclusive of the principal blockchain but participating within the same blockchain network as the principal blockchain. Each of the blockchains, whether a principal blockchain or a participating neighbor blockchain, is a participating blockchain.

Block refers to a member unit of a blockchain, and further refers to a collection of data logically assembled together, and may include a variety of data of fixed types and sizes, and data of non-fixed types and sizes. In other words, a block may contain, for example without limitation, (1) a version identifier, (2) a block identifier, (3) a nonce, (4) a digest (cryptographic hash), (5) a parent digest, (6) a timestamp, and (7) transactional data. Items (1) through (6) may each have a particular data type and size, while item 7 may comprise a collection of data of varying types and/or lengths. Each block can contain a token (e.g., a parent hash), which identifies the immediately preceding block in the blockchain of which the block is a member.

SHA refers to a Secure Hashing Algorithm. A SHA is a one-way cryptographic function or set of functions taking as input a string which may be of variable length and producing output of a fixed length. A purpose of a SHA is to produce an output string from which the input string cannot be derived. For purposes of this disclosure, references to SHA are directed toward a SHA-2 family implementation known as SHA256 according to (or complying with) a standard of the United States National Security Agency published in the Federal Information Processing Standards (FIPS) Pub. 180-4 by the National Institute of Standards and Technology (NIST). SHA256 is capable of taking an input string of variable length of up to over 1.844e19 characters (over 2,000,000 terabytes) and producing a 256-bit (32-byte) output string. In at least some SHA256 implementations, the input string can be (null) and produce an output string. The output string of SHA256 (or another SHA) is known as a digest. The term "hash" may be used interchangeably with digest. Other suitably secure cryptographic hashing algorithms may be used in some embodiments of the present disclosure.

A digest is an output from a secure hashing algorithm. With SHA256, the digest is 256 bits, or 32 bytes, in length. The digest, also known as a hash (or a cryptographic hash), has a fixed length of 256 bits, thus SHA256 may produce up to $2^{256}$ distinct digests. The representation of the digest may vary in length depending on the computing system encoding method. For example, a hexadecimal computing system may represent the digest as 32 character string.

Double(-)hash or double(-)hashing refers to "hashing a hash," or generating a digest then using that digest as the input string for another hash iteration to produce a new digest.

Merklize or merklizing refers to a process in which each of a collection of data strings is processed through a SHA, and each resulting digest is paired with another likewise-produced digest by concatenation and then processed through a SHA again to produce a new digest, with the procedure repeating until only a single digest remains. If at any iteration an odd number of digests exists (greater than one (1)), one of the digests is duplicated and the duplicate concatenated to its original, then processed through the SHA. The single remaining digest may be known as a merkle root for the particular collection of data strings. Similarly, merklized refers to data having been processed by merklization.

Cross-merklization refers to merklization wherein data, which may be in the form of a digest, from one blockchain is merklized with data, which may also be in the form of a digest, of another blockchain. In a blockchain network, each participating blockchain contributes a digest relating the particular blockchain's latest block to each other participating blockchain, and each participating blockchain merklizes together all digests received for the current block.

System time refers to a time of a timekeeping subsystem of a computing system. The present disclosure is agnostic toward the currently ubiquitous practice of configuring a timekeeping subsystem of a computing system to periodically synchronize itself to a remote timekeeping system (such as a time server operated by the US National Institute of Standards and Technology (NIST)). Generally, system time is considered absolute time within the particular computing system, regardless of synchronization to an external time server.

Relative time refers to an ordering of events based on the apparent time the event occurred, was perceived by, or reported to the particular ordering mechanism without adherence to a strict time reference. For illustrative purposes, an Event A may occur within a computing system CS-A at 20180601:0101:10.150 UTC, an Event B may occur within a computing CS-B 400 milliseconds after Event A relative to UTC, and an Event C may occur within a computing system CS-C 1,300 milliseconds (1.3 seconds) after Event A, and 900 milliseconds after Event B relative to UTC. CS-A and CS-B may report the occurrence of Events A and B to CS-C, including the event system time. Because of network topology, the report of Event B may arrive at CS-C 700 milliseconds after Event B occurred, and 200 milliseconds before Event C occurs. Because of remoteness and network latency, the report of Event A may arrive at CS-C 2,900 milliseconds (2.9 seconds) after Event A occurred, and 1,600 milliseconds (1.6 seconds) after Event C occurred. To CS-C, the relative time (order) of these events based on when Event C occurred within CS-C and the reports of Events A and B arrived to CS-C is B C A, even though the absolute order according to UTC is A B C.

Endianness refers to the order of significant bits in a value within a computing system, including an input, an output, or any transitional value. Big endianness refers to the ordering of bits in diminishing significance. Little endianness refers to the ordering of bits in increasing significance. For example, and using base-10 for ease of reference, a big-endian "1000" represents one thousand, which may be represented in little endian by "0001."

A collision refers either to identical digests (or digest collision) being produced from a SHA, or an incidence of two or more blocks simultaneously (or block collision). A digest collision, however unlikely, is theoretically possible from differing input strings. A digest collision may result from multiple computing systems producing identical digests simultaneously to each other, or nearly so, while participating in, for example, a blockchain network. A block collision may occur when two (or more) computing systems participating in a blockchain network produce and/or deliver and/or receive blocks either at the same time, or having identical timestamps. Blockchain systems comprise methods to mitigate each of these collision types in a manner that prevents the blockchain(s) from failing or stalling. For example, a computing system receiving a block from another blockchain bearing an identical timestamp to the receiving computing system's latest native block may simply ignore the incoming block's timestamp and treat the incoming block as arriving immediately after the latest native block. Similarly, a blockchain participating computing system receiving a block from another blockchain simultaneous to the production of a native block may be configured to treat the incoming block as arriving after the new native block regardless of the incoming block's timestamp. A blockchain participating computing system receiving a block from each of two (or more) participating computing systems may be configured to order the multiple incoming blocks based on one of each block's timestamp, length (also called height) of each sending blockchain, blockchain ID serialization, etc.

Collision resistance refers to an unlikelihood of different input strings producing a digest collision. (Because resolving a block collision is simply a matter of choosing how to order blocks, block collision resistance is not a significant concern.) Because SHA256 may produce up to $2^{256}$ distinct digests, collision resistance may be deemed quite high. In some computing applications, SHA256 collision resistance may be theoretically decreased by artificially imposing one or more limitations on acceptable result digests. In other words, a particular application may enforce a rule of x consecutive bits having a value of 0, effectively reducing the number of distinct digests which the particular application may accept as output from SHA256. Because SHA is a one-way cryptographic function, such an output-limiting rule cannot serve as an input parameter for SHA256, but only as a post-process implementation necessitating iteratively producing digests with varying input strings until a rule-compliant digest is produced. In at least some blockchain implementations, varying the input string may be accomplished by pre- or appending a nonce to the input string, and incrementing the nonce with each iteration of SHA until a rule-compliant digest is produced.

Collision resolution refers to (a) system(s) or method(s) of deprecating all identical digests but one such that each deprecated digest may be abandoned. When a digest is abandoned, the block of which the abandoned digest is an element may also be abandoned.

Nonce refers to a 32-bit integer. A nonce may be a member of a series of nonces. Generally, in a collection of nonces, each successive nonce is an increment of the previous nonce. An initial nonce (a nonce for a first iteration of a block generation cycle) may be selected, for example without limitation, by an algorithm generating a 32-bit integer, or by a protocol-stipulated initial value. A next nonce (a subsequent iteration for the same block generation cycle) may be by an algorithm again generating a 32-bit integer, or by a protocol-stipulated incrementing of the previously used nonce. In one embodiment, a nonce may be generated anew for each iteration without regard for the value of the preceding nonce.

Proof-of-work refers to generating a digest that is compliant with an output limitation rule imposing a requirement of x consecutive bits having a value of 0. Because a SHA does not take an output-controlling parameter, a digest can be compared to the rule after generation. A digest complying with the rule is produced by iteratively generating digests until a compliant digest results. The compliant digest may serve as demonstrative evidence ("proof") that an amount of computer processing ("work") was expended to produce the digest. An output limitation rule may similarly require x consecutive bits having a value of 1, or a defined substring of a particular length with a particular order of 0s and 1s. A higher (longer) proof-of-work requirement may result in a lower collision resistance.

Target difficulty refers to an element which specifies a particular limitation to form a proof-of-work-compliant digest. For example without limitation, a target difficulty may indicate a digest must have ten (10) consecutive 0-bits in order to qualify as a proof-of-work digest.

Transaction refers to (a) an exchange of goods/service for goods/services, goods/services for payment, exchange of debts, exchange of promises, exchange of obligations, etc.; and (b) a computer function whereby a transaction of type (a) is recorded or otherwise processed; and (c) a computer function whereby a transaction of type (b) is recorded. By way of example, a type (a) transaction may be a sale of a Widget for cash; a related type (b) transaction may by decrementing the number of Widgets in stock as a result of the sale; and a related type (c) transaction may be a computer log entry recording information (for example, user identity, login time, access to inventory software, subtraction of the sold Widget, etc.) about the access which performed the stock decrement. Transactions of type (c) may also include records of installation, modification, or deletion of firmware or software, including image size, digital signature, license, certificate, etc.

Transactional record keeping refers to any manner of making a record of transactions and can be internal to a manner of protection of the record. A record may contain data, known as record data. The terms transactional record, record, and record data may be used interchangeably herein.

Unauthorized access refers to any access or attempt to access a computing system in a manner or for a purpose not intended by the owner and/or operator of the target computing system, and includes access by an authorized user for an unauthorized purpose.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The terms "a" and "an" can be described as one, but not limited to one. For example, although the disclosure may recite a tab having "a line of stitches," the disclosure also contemplates that the tab can have two or more lines of stitches.

Unless otherwise stated, all ranges include both endpoints and all numbers between the endpoints.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

FIG. 1 is a diagram of a block 10 of a blockchain within a computing system 1 according to an embodiment of the present disclosure. The computing system 1 may be a principal computing system operated by a computer operator to at least implement the blockchain 10. The block 10 may be produced or otherwise implemented on the computing system 1 by a blockchain implementation according to an embodiment of the present disclosure. The block 10 comprises a block identifier (or block ID) 12, a blockchain version (or blockchain version identifier) 14, a blockchain identifier (or blockchain ID) 16, a timestamp 18, a proof-of-work region (or POWR) 20 (which may be considered a set within the meaning of mathematical set theory), a block digest 30, a target difficulty 40, a blocknonce 50, and a collection 60 of contributing digests. The block 10 may include one or more records digest(s) 70, 72, 74, and may be considered a set within the meaning of mathematical set theory. The block 10 may include one or more block headers 80, 82. The block 10 may include a collection 90 of records and may include record data.

The computing system 1 may include one or more computing devices, each comprising one or more processors, one or more computer readable media, one or more electronic memory, one or more input/output devices, and/or one or more communication interfaces.

The order of the elements 12-90 shown in FIG. 1 is for the convenience of the reader, and not a requirement of a particular embodiment of the disclosure. An embodiment of the present disclosure may have more elements than described herein, or fewer, and may be structured or otherwise arranged in any of a variety of ways in storage on one or more computer readable media.

Figure 2:
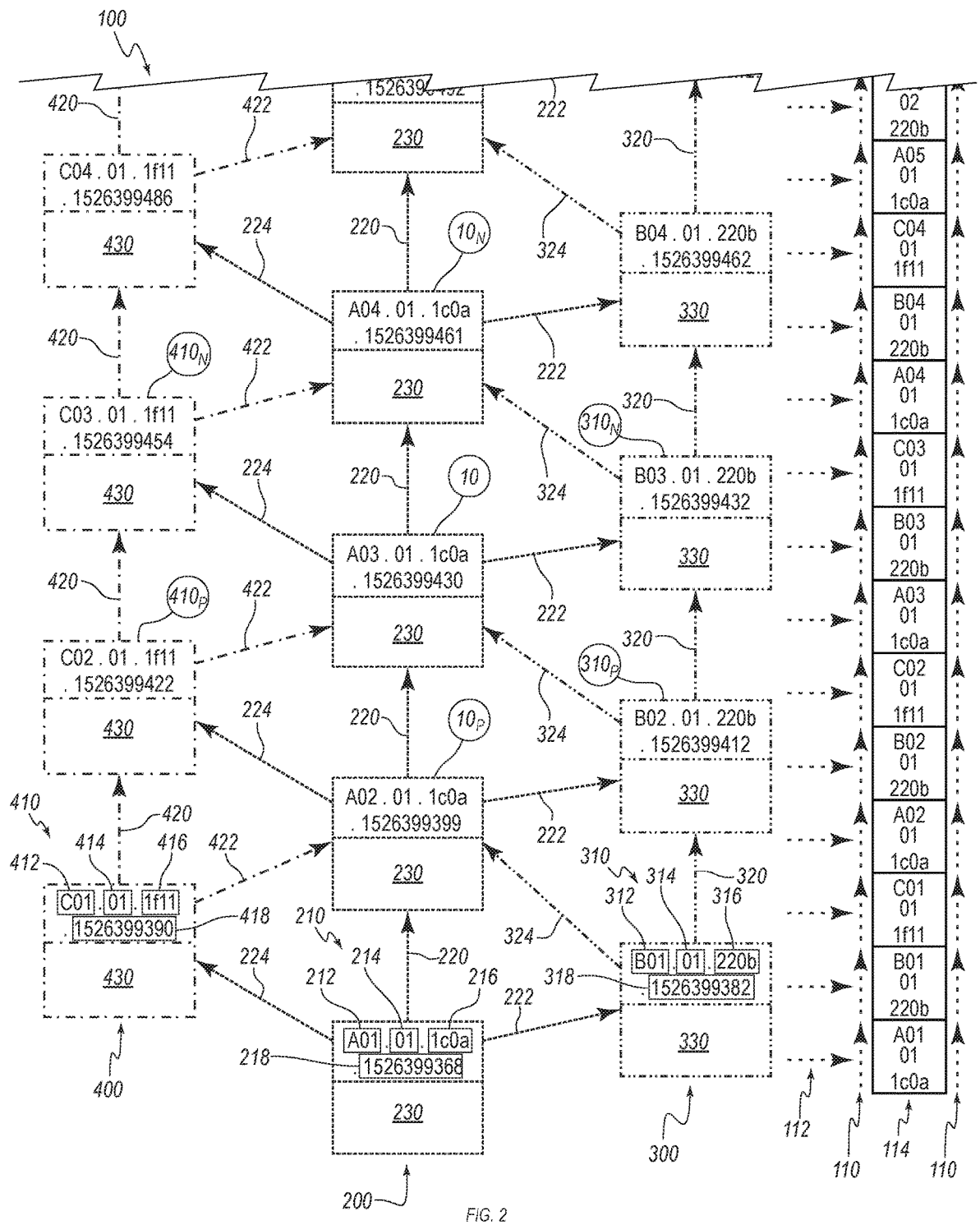
FIG. 2 is an illustration of an example blockchain network comprising participating blockchains according to an embodiment of the present disclosure.

FIG. 2 is an illustration of an example blockchain network 100 comprising three participating blockchains, namely a principal blockchain 200, a first participating neighbor blockchain 300, and a second participating neighbor blockchain 400, according to an embodiment of the present disclosure. The principal blockchain 200 may be implemented on a principal computing system, such as the computing system 1 of FIG. 1. The principal blockchain 200 comprises a principal series of blocks (or series of blocks), of which a block 210 according to one embodiment is identified. The block 10 of FIG. 1 is also shown in the context of the blockchain network 100 and the principal blockchain 200. Although FIG. 2 depicts three participating blockchains 200, 300, 400 in the blockchain network 100, additional participating neighbor blockchains may be present in an embodiment of a blockchain network according to the present disclosure.

The initial block 210 of the principal blockchain 200 comprises at least a unique block ID 212, a blockchain version 214, a blockchain ID 216, a timestamp 218, and a data region 230. The unique block ID 212 is analogous to (and value-wise distinct from) the unique block ID 12 of the block 10. The blockchain version 214 is analogous to the blockchain version 14 of the block 10. The blockchain ID 216 is analogous to the blockchain identifier 16 of the block 10. The timestamp 218 is analogous to (and value-wise distinct from) the timestamp 18 of the block 10. The data region 230 may include elements analogous to other elements of the block 10 of FIG. 1 and may include elements not identified in FIG. 1. An initial block 310 of the first participating neighbor blockchain 300 is identified, having elements 312, 314, 316, 318, 330 generally analogous to the block 210 of the principal blockchain 200. An initial block 410 of the second participating neighbor blockchain 400 is identified, having elements 412, 414, 416, 418, 430 generally analogous to the initial block 210 of the principal blockchain 200.

Each of the initial blocks 210, 310, 410 is represented at the lowest aspect of the respective blockchains 200, 300, 400, although this is for ease of reference only. The initial blocks 210, 310, 410 may be succeeded each by a series of blocks within the respective blockchain 200, 300, 400 of each initial block 210, 310, 410. By way of example, the initial block 210 of the principal blockchain 200 is shown to have a succeeding block $10_P$, to which the block 10 is a subsequently succeeding block, and the block 10 is shown with a further succeeding block $10_N$. Each of the succeeding blocks $10_P$, 10, $10_N$, etc., of the principal blockchain 200 has a timestamp analogous to the timestamp 218 of the block 210. The timestamp (analogous to the timestamp 218) of each succeeding block $10_P$, 10, $10_N$ is shown as recording successively later times. Within the principal blockchain 200, the timestamps recorded in each succeeding block form an absolute time reference within the principal blockchain 200.

The participating neighbor blockchains 300, 400, similarly are represented having successively later succeeding blocks $310_P$, $410_P$, and otherwise generally and functionally resemble the principal blockchain 200. Like the succeeding block timestamps of the principal blockchain 200, succeeding block timestamps of each participating neighbor blockchain 300, 400 form an absolute time reference within the respective blockchain 300, 400.

The principal blockchain 200 may be resident within the computing system 1 of FIG. 1 from which the blockchain 200 derives the time for each succeeding block timestamp. Each participating neighbor blockchain 300, 400 may similarly reside within a respective, distinct computing system, which may be analogous to the computing system 1 of the principal blockchain 200. Each participating neighbor blockchain 300, 400 may derive the time for each succeeding block timestamp with the respective blockchain 300, 400 from the system time of the computing system (analogous to the computing system 1 of the blockchain 200) wherein the respective participating neighbor blockchain 300, 400 resides. As may be well understood by one of ordinary skill in the art, each of the plurality of computing systems may have differing system time settings.

The principal blockchain 200 may be agnostic with regard to the relative time of production of a block within a participating neighbor blockchain 300, 400. As each such block of a participating neighbor blockchain 300, 400 is communicated to the principal blockchain 200, the principal blockchain 200 may be aware of a relative time that the blockchain 200 becomes aware of the existence of the block from the participating neighbor blockchain 300, 400. More broadly, as each of the blockchains 200, 300, 400 creates a block, for example the blocks 210, 310, 410 respectively, and communicates the same among the other blockchains 200, 300, 400 within the blockchain network 100, each of the blockchains 200, 300, 400 may note 112 the creating of each succeeding block and may order 114 the blocks in a time-advancing 110 series. In other words, each blockchain 200, 300, 400 may be aware of the time order 114 of the creation (or communication of creation) of each block of each blockchain 200, 300, 400 in the blockchain network 100, whereby the series of blocks within the blockchains 200, 300, 400 may be chronologically linked.

Reference is now made to FIGS. 1 and 2. In the present example, the block 10 of FIG. 1 is a member of the principal blockchain 200 in FIG. 2. The block ID 12 may be unique to the block 10. In other words, each block in a blockchain may have a unique block ID 12. The blockchain version 14 may identify the particular implementation of blockchain protocol used by the principal blockchain 200 in producing the block 10. The blockchain ID 16 may identify the particular blockchain 200 of which the block 10 is a member. The blockchain ID 16 is shown as a 4-byte hexadecimal representation as a matter of convenience only and is not a requirement of this disclosure. (In an embodiment, a binary tree may be implemented.) The blockchain ID 16 may be formed in a variety of different ways, provided the blockchain ID 16 can be unique to each blockchain. The timestamp 18 may report the system time at which the block 10 was produced. The timestamp 18 may take the form of, for example without limitation, a Unix epoch timestamp, or any other form compliant with an embodiment of a blockchain protocol according to this disclosure.

The block digests collection 60 comprises most recent digests 66, 64, 62 from each blockchain 200, 300, 400 participating in the blockchain network 100. In the example of FIG. 1, the block digests collection 60 comprises the digest 62 of a most recent block of the participating neighbor blockchain 300, the digest 64 of a most recent block of the participating neighbor blockchain 400, and the digest 66 of a most recent block in the principal blockchain 200 immediately preceding the block 10.

The block digest 30 is created by merklizing the digest 62 and digest 64. In other words, the digests 62, 64 are concatenated so as to form a single 64-byte string, which is then processed through SHA. The output of merklizing the digests 62, 64 through SHA is a 32-byte string wholly comprising the block digest 30. Because each digest 62, 64, 66 is contributed by a different blockchain 200, 300, 400, the merklization of these digests 62, 64, 66 is, in particular, cross-merklization. In a blockchain network having more than three participating blockchains, the block digests collection 60 may comprise a block digest from each participating blockchain, and each such digest may be cross-merklized, and a merkle root of block digests produced to generate the block digest 30. The block 10 includes the digest 66 that was produced in the same manner as part of the most recent block $10_P$ prior to and within the principal blockchain 200. The digest 66 may connect the block 10 to the most recent previously created block $10_P$ within the principal blockchain 200.

Similarly, a protocol of the blockchain 200 of the block 10 may pass the block digest 30 of the immediately succeeding block $10_N$ in the principal blockchain 200. In this manner, the block $10_N$ succeeding the block 10 is connected to the block 10, and the block 10 is connected to the most recent block $10_P$ preceding the block 10. This interconnection of blocks is inherent throughout the principal blockchain 200 and serves to connect each block to its immediate predecessor and successor.

Similarly, the digest 62 may have been passed from the participating neighbor blockchain 300 to the principal blockchain 200, and the digest 64 may have been passed from the participating neighbor blockchain 400 to the principal blockchain 200. This connects the block 10 to an immediately preceding block $310_P$, $410_P$ within each participating neighbor blockchain 300, 400 similar to connecting the block 10 to the immediately preceding block $10_P$ within the principal blockchain 200.

The protocol of blockchain 200 of block 10 may likewise direct a passing of the block digest 30 to each participating neighbor blockchain 300, 400 such that an immediately succeeding block $310_N$, $410_N$ of each participating neighbor blockchain 300, 400 may be connected to the block 10 of the principal blockchain 200. In this manner, each participating blockchain 200, 300, 400 is connected to each other participating blockchain 200, 300, 400. More particularly, the principal blockchain 200 is directly connected to each participating neighbor blockchain 300, 400 by having directly received from each participating neighbor blockchain 300, 400 previous block digests 62, 64 of the blocks $310_P$, $410_P$; and by sending the block digest 30 to each of the participating neighbor blockchains 300, 400. The participating neighbor blockchains 300, 400 are indirectly connected to each other as a result of each participating neighbor blockchain 300, 400 sending block digests (analogous to digests 62, 64) to the principal blockchain 200, and receiving from the principal blockchain 200 block digests (analogous to digests 64, 62) of the other participating neighbor blockchain 400, 300. The blockchain protocol of each participating blockchain 200, 300, 400 may cross-merklize the digests (analogous to 62, 64, 66) into each participating blockchain's next succeeding block. This cross-merklization process may proliferate throughout the blockchain network 100, thereby interconnecting the participating blockchains 200, 300, 400 in a cryptographically and independently verifiable manner. The cross-merklization process decouples immutability from consensus. More specifically, by sharing (i.e., sending a block digest 30) to other participating neighbor blockchains 300, 400 in the blockchain network 100, immutability of the data (which is an objective of and enabled by a blockchain) is decoupled from the consensus (i.e., a mechanism for reaching agreement among participants to add a block) of the participating blockchains 200, 300, 400.

Figure 3:
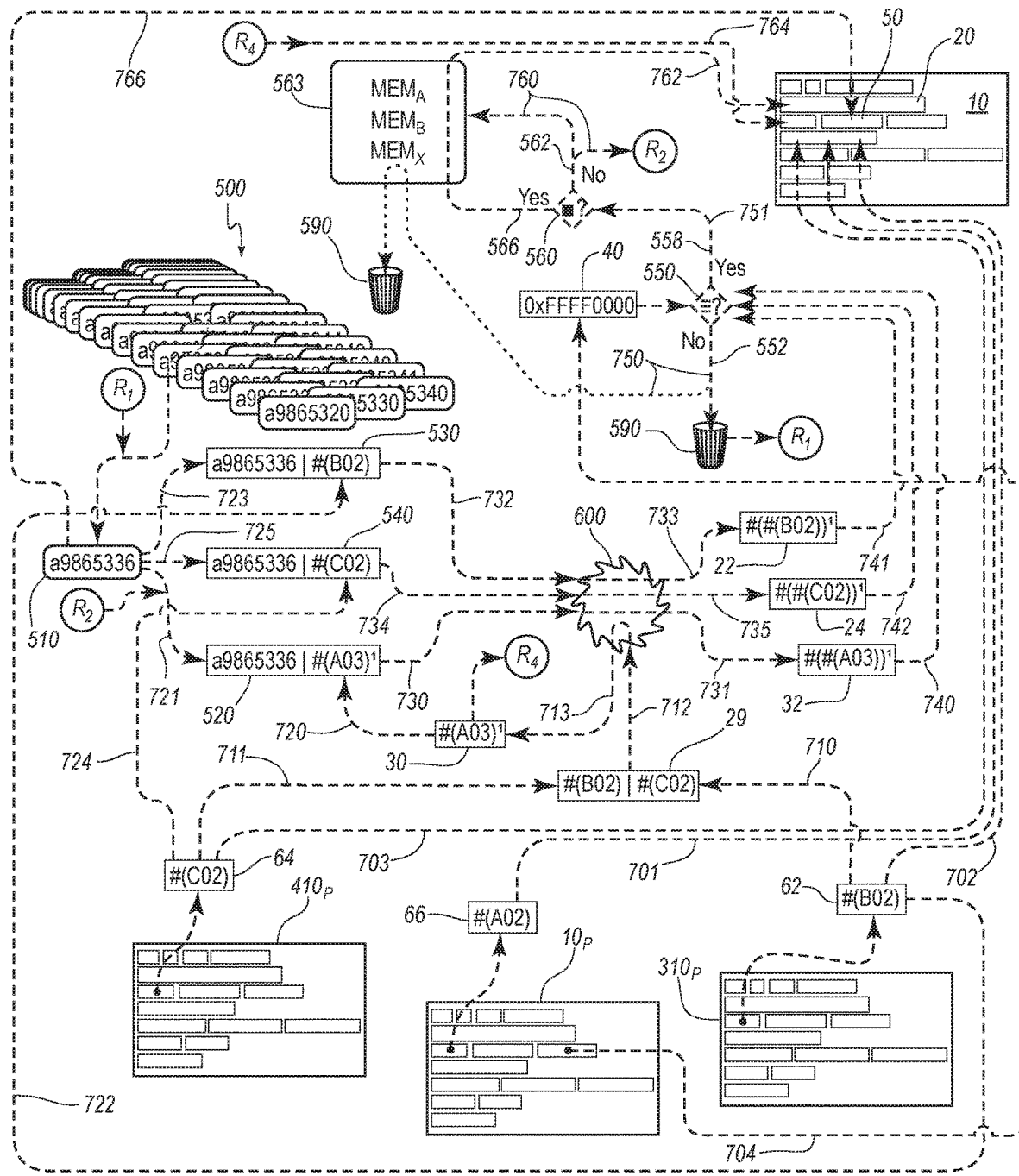
FIG. 3 is a partial flow diagram illustrating the generation of particular data for the block of FIGS. 1-2 according to an embodiment of the present disclosure.

FIG. 3 is a partial flow diagram illustrating the generation of data for the block 10 (upper right corner of FIG. 3), according to an embodiment of the present disclosure. The block 10 may be analogous to block 10 of FIGS. 1-2 and, as previously described, may be immediately preceded in the principal blockchain 200 by the block $10_P$. Beginning at the bottom of the flow diagram, a digest 66 of the block $10_P$ may be passed 701 directly to the block 10. The digest 66 may serve as reference to the block $10_P$ as the block immediately preceding the block 10 being generated. The latest preceding block $310_P$ of the participating neighbor blockchain 300 may be communicated (see 324 in FIG. 2) to the principal blockchain 200. The digest 62 of the block $310_P$ may be extracted and passed 702 directly to the block 10. Similarly, a latest preceding block 410P of the participating neighbor blockchain 400 may be communicated (see 422 in FIG. 2) to the principal blockchain 200, and the digest 64 extracted and passed 703 directly to the block 10.

The target difficulty 40 may also be extracted 704 from the preceding block $10_P$. In one embodiment, the target difficulty 40 may also be extracted from the block $310_P$, $410_P$ of the participating neighbor blockchain 300, 400 for comparison to the target difficulty 40 of the preceding block $10_P$ as an additional validity check prior to including data from the participating neighbor blockchain 300, 400 into the block 10.

The digest 62 from the block $310_P$ and the digest 64 from the block $410_P$ may be concatenated together 710, 711 to form an input string 29. The order of appearance in the concatenation may be set as a requirement of a particular implementation of the blockchain protocol of the blockchain network 100. The input string 29 may then be processed through a SHA 600 to generate 713 a block digest 30 for the block 10. The block digest 30 may be passed 766 (through R4) to the block 10. At a later stage, when the principal blockchain 200 is generating the succeeding block $10_N$, the block digest 30 may be passed as an element of the block 10 to the block $10_N$, and may serve as a reference from the block $10_N$ back to the block 10, which includes the digest 66 as a reference to the preceding block $10_P$. This procedure of including each previous block's block digest into the succeeding block forms a chain of referential connectivity between each block of a blockchain so as to establish an immutable record of block order within the blockchain. This immutable ordering of blocks within a blockchain inherently establishes an immutable record of the data included in each of the blocks of the particular blockchain, and, hence, of each participating blockchain in the blockchain network 100. Also, the immutability is decoupled from any requirement by an individual blockchain for consensus of the participating nodes to add a block.

A nonce pool 500 may be utilized by each blockchain 200, 300, 400, each participating blockchain 200, 300, 400 having its own nonce pool 500. A candidate nonce 510 may be drawn from the nonce pool 500. In one embodiment, the candidate nonce 510 may be generated by an algorithm to produce a 32-bit integer. The manner of selecting a first candidate nonce 510 may be prescribed by the blockchain protocol of the participating blockchain 200, 300, 400, and may be defined by a protocol of the blockchain network 100. The candidate nonce 510 and the block digest 30 may be concatenated together 720, 721 to form an input string 520. The input string 520 may then be processed 730 by the SHA 600 to produce 731 a candidate proof-of-work digest (POW digest) 32 based on the block digest 30. The candidate POW digest 32 may then be compared 740 with the target difficulty 40 at 550.

The target difficulty 40 is shown as a hexadecimal value in the present example, however, neither the explicit expression 0xFFFF0000 nor the hexadecimal format is required by this disclosure. The target difficulty 40 may be expressed in a form that conveys to each blockchain 200, 300, 400 of the blockchain network 100 a specific number of consecutive bits having an "off" value (or bytes having a "0" value) appearing at either the big or little end of a resulting digest in order to qualify as a POW. In another embodiment, the target difficulty 40 may be structured to require a specific number of consecutive bits having an "on" value (or bytes having a "1" value). In another embodiment, the target difficulty 40 may require a specific sequence of "off" and "on" bits ("0" and "1" bytes) spanning a designated portion of the candidate POW digest 32.

If the candidate POW digest 32 does not comply 552 with the target difficulty 40, the candidate POW digest 32 and the candidate nonce 510 are abandoned 590 and the blockchain returns $R_1$ to the nonce pool 500. A new candidate nonce 510 is selected. The manner of selection of the new candidate nonce 510 may be prescribed by the blockchain protocol of the participating blockchain 200, 300, 400, and may be defined by the protocol of the blockchain network 100, such as, for example without limitation, by always incrementing the nonce value with each iteration, or by always decrementing with each iteration. The new candidate nonce 510 may be concatenated to the block digest 30 then processed through the SHA 600, then compared 550 for compliance with the target difficulty 40. These steps may iterate repetitively, with a new candidate nonce 510 for each iteration, until a candidate POW digest 32 is produced which complies with the target difficulty 40.

If the candidate POW digest 32 complies 550 with the target difficulty 40, a cursory test 560 is performed to determine if any other POW digests are required to complete the block 10 POWR 20. Because the current candidate POW digest 32 is a product of the current block 10, at least one additional POW digest is required. In the current example, two additional POW digests are needed. For this reason, the "last digest" test 560 fails 562. The current candidate POW digest 32 may be placed 760 in temporary memory 563, and the blockchain 200 returns $R_2$ to the current candidate nonce 510. The candidate nonce 510 producing the successful candidate POW digest 32 is reused 723 by concatenating the candidate nonce 510 with the digest 62 (722) to produce an input string 530. The input string 530 may be passed 732 to the SHA 600 to produce 733 a candidate POW digest 22. The candidate POW digest 22 is then processed 741 to compare to the target difficulty 40. If the current candidate POW digest 22 does not comply 550 with the target difficulty 40, the current candidate POW digest 22 and candidate nonce 510 are abandoned 552, 590. Furthermore, the previous candidate POW digest 32 is removed from the temporary memory 563 and abandoned 590. The blockchain 200 then returns $R_1$ to select a new candidate nonce 510.

If the candidate POW digest 22 complies 550 with the target difficulty 40, the candidate POW digest 22 may be stored 760 in the temporary memory 563 along with the previous candidate POW digest 32. The blockchain continues to iterate through nonce selection $R_1$, $R_2$ until a candidate POW digest 32, 22, 24, etc. complying with the target difficulty 40 has been generated for each latest block digest 66, 62, 64, etc. of the principal blockchain 200 and the participating neighbor blockchains 300, 400, etc. Once a target difficulty 40 compliant candidate POW digest 32, 22, 24, etc. has been generated for each block digest 66, 62, 64, etc., each of the candidate POW digests 32, 22, 24, etc. may be placed in the POWR 20 of the block 10. The principal blockchain 200 may also store the successful candidate nonce 510 as the blocknonce 50 in the block 10.

Once the block 10 has been generated, the principal blockchain 200 may pass the block 10 to each of the participating neighbor blockchains 300, 400. The block 10 includes the digests 62 and 64, which the blockchain 200 received from the last previous block $310_P$, $410_P$ of each of the respective participating neighbor blockchains 300, 400. In other words, an element of the block 10 is the digest 62 from the first participating neighbor blockchain 300 last previous block $310_P$. Accordingly the digest 62 is received from, then sent back to the participating neighbor blockchain 300, which allows the participating neighbor blockchain 300 to check or otherwise monitor the integrity of its own stored data and/or transactions. Likewise, the digest 64 was received from, and will be sent back to the second participating neighbor blockchain 400, allowing the second participating neighbor blockchain 400 to verify or otherwise monitor its own integrity of stored data and/or transactions. The POWR 20 of the block 10 provides assurance to each of the participating neighbor blockchains 300, 400 of the validity of the block 10, thereby assuring each of the participating neighbor blockchains 300, 400 that each is receiving the respective digests 62, 64 as the digests 62, 64 were received at the principal blockchain 200. Similarly, the block 10 conveys to each of the participating neighbor blockchains 300, 400 the block digest 30. Each of the participating neighbor blockchains 300, 400 will return the block digest 30 to the principal blockchain 200 with the next subsequent block from each participating neighbor blockchain 300, 400. This permits the principal blockchain 200 to authenticate to itself the veracity of the blockchain 200, and hence the transactional records of each block of the blockchain 200. Furthermore, because the principal blockchain 200 transmits to each of the participating neighbor blockchains 300, 400 the successful candidate nonce 510, each of the participating neighbor blockchains 300, 400 can process each previous block digest 62, 64, 66 through SHAs using the disclosed successful candidate nonce 510 to ensure that the POWR has been generated according to the blockchain protocol, and that each block digest 62, 64, 66 is correct. In this manner, each participating blockchain may have high confidence as to the integrity of the data—including the order of transactions and digests—of each participating blockchain 200, 300, 400, even though each participating blockchain 200, 300, 400 is unaware of the actual data of every other participating blockchain 200, 300, 400. This creates an immutable record for each blockchain 200, 300, 400 without a prior need for trust and without a reliance on consent other than to participate in the blockchain network 100. In other words, the immutability of the data is decoupled from the consensus of the participating blockchains 200, 300, 400.

Furthermore, the ability of each participating blockchain 200, 300, 400 to independently verify that the candidate nonce 510 and previous block digests (analogous to digests 62, 64, 66 of FIGS. 1, 3) produce target difficulty-compliant digests (analogous to 22, 24, 32 of FIG. 3) enables each of the participating blockchains 200, 300, 400 to recognize an anomaly relative to data of one of the participating blockchains 200, 300, 400. In other words, if the participating neighbor blockchain 300 performs a verification of the digests (analogous to the digests 62, 64, 66) using the candidate nonce 510 reported by principal blockchain 200 and any one of the resulting digests from the verification process fails to match the corresponding digest reported by the principal blockchain 200, the participating neighbor blockchain 300 may identify the digest anomaly to each participating blockchain 200, 300, 400. This permits the detection of a data anomaly in a participating blockchain 200, 300, 400 of the blockchain network 100 within moments of the event which caused the anomaly and without disclosure of the actual data involved. Additionally, the participating blockchain 200, 300, 400 identifying the anomaly can also bundle the previously known correct block data with the anomalous data identified and propagate a proof of misbehavior to each other participating blockchain 200, 300, 400, including that blockchain 200, 300, 400 in which the anomaly resides. This cross-reporting of the anomaly, or proof of misbehavior, may enable each participating blockchain 200, 300, 400 to both insulate itself from possible injection of bad data, and also provides an audit trail for each computer system owner/operator to isolate to within a few moments the occurrence of the anomalous data regardless of source. For example, in a worst case scenario, if anomalous data is detected by the participating neighbor blockchain 400 in a block from the participating neighbor blockchain 300 and the computing system(s) of the entity operating the participating neighbor blockchain 300 is/are so severely compromised that the computing system owner/operator is unable to locate the anomaly by internal means, the data from any other participating blockchain 200, 400 may enable reconstruction of the anomaly event and assist in correction and mitigation.

By way of example, if a block of the principal blockchain 200 becomes altered, hence, anomalous, at a neighbor blockchain 300, 400, the digest transmitted by the neighbor blockchain 300, 400 will not match the digest calculated by the principal blockchain 200 when the now-anomalous block is transmitted by the misbehaving neighbor blockchain 300, 400 to the principal blockchain 200. In this way, the principal blockchain 200 (as well as each non-misbehaving neighbor blockchain) may infer the defect in the transmitted block and simultaneously preserve the immutability of each non-anomalous block throughout the blockchain network 100.

Figure 4:
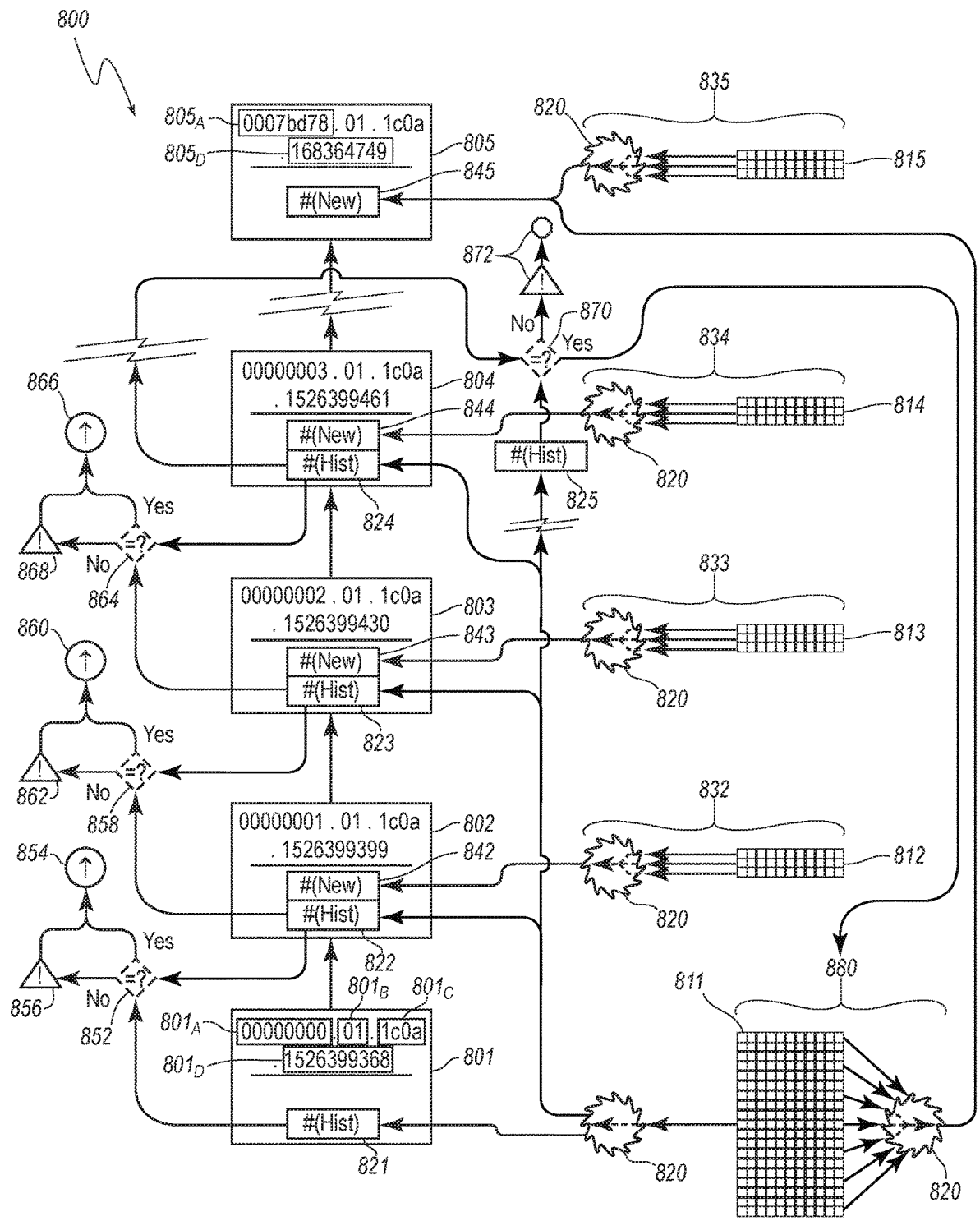
FIG. 4 is a partial flowchart of a blockchain at and shortly after startup and having a collection of data pre-dating the blockchain startup according to an embodiment of the present disclosure.

FIG. 4 is a partial flowchart of an example blockchain 800 at and shortly after startup and having a collection of data 811 pre-dating the blockchain 800 startup according to an embodiment of the present disclosure. The blockchain 800 comprises a first block 801 and a series of subsequent blocks, of which a first subsequent block 802, a second subsequent block 803, a third subsequent block 804, and a future subsequent block 805 are shown. The first block 801 comprises a block ID $801_A$, a blockchain version $801_B$, a blockchain ID $801_C$, and a block timestamp $801_D$. The subsequent blocks 802, 803, 804, and 805 may include elements analogous to the block ID $801_A$, the blockchain version $801_B$, the blockchain ID $801_C$, and the block timestamp $801_D$.

An entity, for example, a company, may have an existing computing system (see 1 in FIG. 1) for transactional record keeping prior to transitioning to or adopting a blockchain similar to the blockchain 800. In some embodiments, the entity may choose to continue to record transactions as before implementing the blockchain 800 such that record keeping data may continue to be generated in parallel with the blockchain 800. In some embodiments, the entity may choose to adopt the blockchain 800 with future data merklized into the blockchain 800 from the date of implementation. The blockchain 800 may participate in a blockchain network similar to the blockchain network 100 of FIG. 2; however, for convenience, the blockchain 800 is illustrated without reference to a blockchain network.

A collection of data (pre-existing data) 811, which may comprise any form of data, for example without limitation, transactional record keeping data, may exist prior to the startup of the blockchain 800. The pre-existing data 811 may be processed through a SHA 820 to produce a digest 821. The digest 821 may be included in the first block 801 of the blockchain 800. In one embodiment, a "first" block may be a pure genesis block, meaning, the actual initial block of the blockchain 800 may contain no transactional data digest. In such an embodiment, references to the first block 801 apply to the "first" block after the genesis block.

The blockchain 800 may produce the second block 802 at an interval following the first block 801 in accordance with parameters of the blockchain 800. The blockchain 800 may merklize 832 any data 812 produced after the block 801. In such an implementation, the merklization of the data 812 may produce a merkle root (not shown) which may be included in or constitute the digest 842. In conjunction with production of the second (first subsequent) block 802, the pre-existing data 811 may be processed again by the SHA 820 to produce a digest 822. The digest 822 may be compared 852 to the digest 821 of the first block 801. If the digest 822 matches the digest 821, no action is taken and the blockchain continues 854. In other words, block production, and, therefore, the blockchain 800 continues regardless of detection of an anomaly. This is true also when an anomaly is detected in a participating neighbor blockchain.

Similarly, in conjunction with production of the second subsequent block 803, data following the block 802 may be merklized 833 to produce a digest 843; and a digest 823 of the pre-existing data 811 may be produced. The digest 823 may be compared 858 to the digest 822 of the previous block 802. With production of the third subsequent block 803, and each further subsequent block, new data is merklized 833, et seq., a new digest 823, et seq. of the pre-existing data 811 may be generated, with each subsequent digest 823, et seq. compared 858, 864, etc. to the immediately preceding block's digest 822, 823, et seq. for the pre-existing data 811.

If at generation, for example, of the first subsequent block 802, the digest 822 does not match the previous digest 821, an alert 856 may be generated to apprise a computing system owner or operator of the mismatch. Such a mismatch may indicate an anomaly in the computing system, such as may arise if the pre-existing data 811 has been altered after the digest 821 was produced. Such an anomaly need not prevent the blockchain 800 from continuing 854 to operate. Each subsequent block 802, 803, 804, etc. may entail a similar comparison 852, 858, 864, etc. of the newest digest 822, 823, 824, etc. of the pre-existing data 811 to the digest 821, 822, 823, etc. of the pre-existing data 811 for the immediately preceding block 801, 802, 803, etc. The interval between each block 801, 802, 803, etc. may be determined by the blockchain protocol of the blockchain 800, and may range from few seconds to a number of minutes. This interval between block generation comprises the theoretical maximum period of time between the introduction of an anomaly into the computing system hosting (and/or being monitored by) the blockchain 800 and initial detection of the anomaly. The alert 854, 860, 866, etc., may be generated and delivered to a computer owner or operator within moments of the introduction of the anomaly into the computing system.

At the generation of a future block 805 of the blockchain 800, a new digest 825 of the pre-existing data 811 may be generated. The new digest 825 may be compared 870 to the pre-existing data 811 digest of the last preceding block. If an anomaly is detected 872, the blockchain 800 may send an alert 872 and continue in the same manner as before the future block 805. If no anomaly is detected, the pre-existing data 811 may be merklized 880 and included in the digest 845. The digest 845 may be produced exclusive of the merklized pre-existing data 811 in the event an anomaly has been detected, based on the data 815 produced since the last previous block. In other words, the digest 845 may be a digest of the new data 815 merklized 835, or it may comprise the merklized 835 new data 815 and the merklized 880 pre-existing data 811. In another embodiment, a series of future blocks, such as the future block 805, may include a digest such as the digest 845 comprising a portion of the pre-existing data 811, such that distinct portions of the pre-existing data 811 may be included into a series of corresponding distinctive future blocks of the blockchain 800. In another embodiment, the pre-existing data 811 may be merklized and included in the first block 801, with subsequent data 812, 813, 814, etc. merklized and included in the corresponding subsequent blocks 802, 803, 804, etc.

Figure 5:
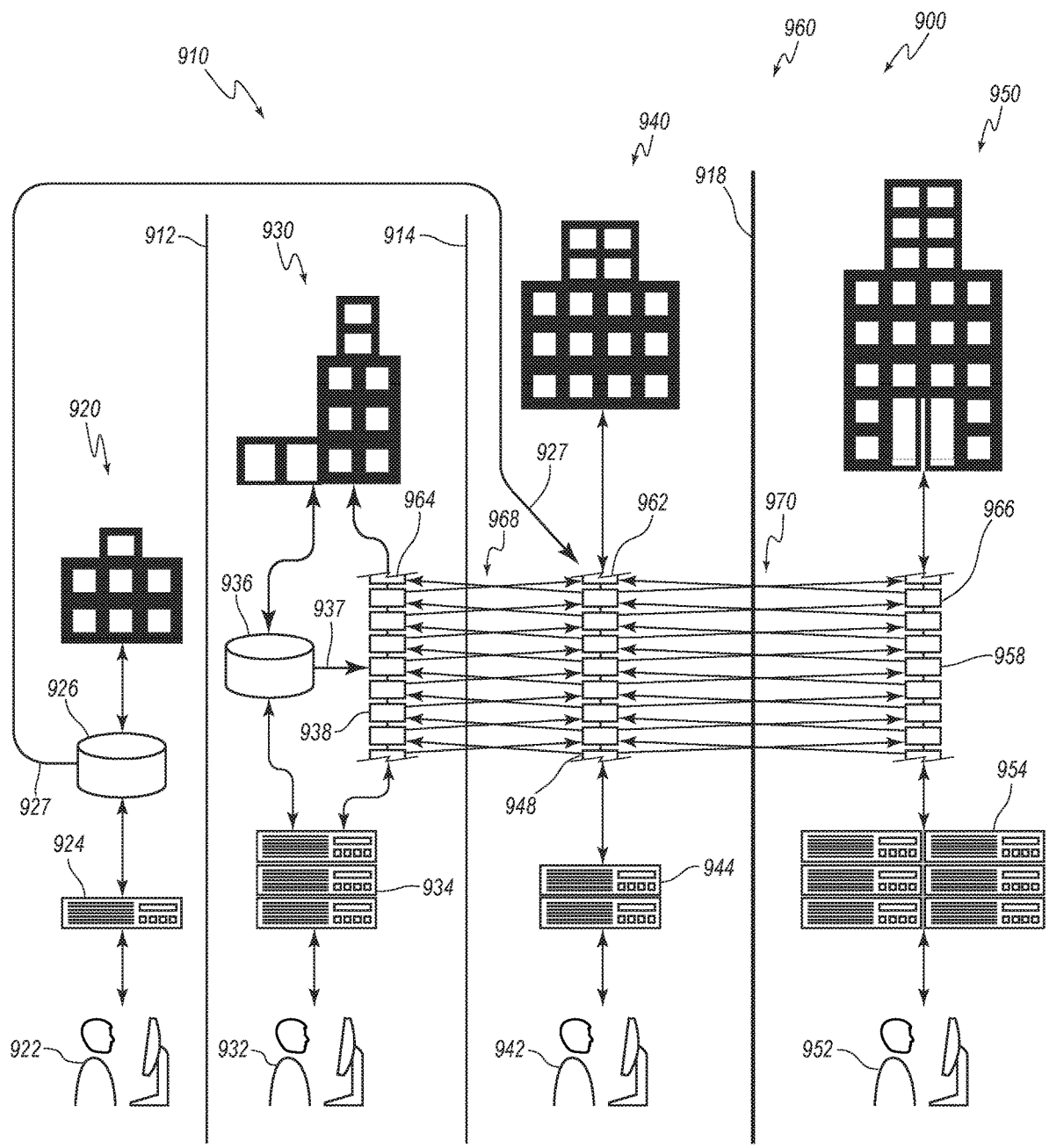
FIG. 5 is a diagram of a multiplex network including a blockchain network, according to an embodiment of the present disclosure.

FIG. 5 is a diagram of a multiplex network 900 including a blockchain network 960, according to an embodiment of the present disclosure. The multiplex network 900 may include, in addition to the blockchain network 960, one or more local networks and/or non-local networks (not shown). The multiplex network 900 comprises at least a first entity 910 and a second entity 950. Each entity 910, 950 of the multiplex network 900 may be organized as one or more divisions. For example, the first entity 910 is depicted having at least a first division 920, a second division 930, and a third division 940. Each division 920, 930, 940 of the first entity 910, and the second entity 950 may each interface with one or more computer user(s) 922, 932, 942, 952. Each computer user 922, 932, 942, 952 may interact with a computing system 924, 934, 944, 954 of the respective division 920, 930, 940 and entity 910, 950. Each division 920, 930, 940 may be logically and/or physically separated 912, 914 from each other division 920, 930, 940. The first entity 910 may be logically and physically separated 918 from the second entity 950.

Each computing system 924, 934, 944, 954 may comprise hardware, software, and firmware (not shown) which, in addition to any other function served, may be capable of creating a variety of logs. For example, an accounting software, in addition to recording human readable transactions, may also generate a log to record when the software was installed, when it was updated, each time it is started ("opened" or "launched") and closed, user login information, user-audit data, transaction-audit data, etc. Another example may be found in a system log generated by the operating system of the computing system 924, 934, 944, 954. For purposes of this disclosure, and in particular with reference to FIG. 5, transactional record keeping includes log data generated by components of each computing system 924, 934, 944, 954.

The computer user 922 of the first division 920 may interact with the computing system 924 of the first division 920 to perform transactional record keeping for the first division 920 of the first entity 910 in the form of a data store 926. The store 926 may comprise any of a generic spreadsheet, a dedicated accounting software platform, a custom database, system log, etc. In the example of FIG. 5, the first division 920 of the first entity 910 may engage in transactional record keeping outside a blockchain.

The computer user 932 of the second division 930 may interact with the computing system 934 of the second division 934 to perform transactional record keeping for the second division 930 of the first entity 910. The transactional record keeping (including log data generated by various components of the computing system 934 itself) of the second division 930 may comprise a data store 936 analogous to the data store 926 of the first division 910, and may also comprise a blockchain 938. In one embodiment, transactional record keeping may take place in parallel in both the data store 936 and the blockchain 938. In one embodiment, the computer user 932 may make transactional record keeping entries into the data store 936 and the data store 936 may further communicate 937 the transactional record keeping entries to the blockchain 938. The transactional records comprising log data of various components of the computing system 934 may be entered (or otherwise stored) directly into the blockchain 938 by the computing system 934.

The computer user 942 of the third division 940 may interact with the computing system 944 of the third division 940 to perform transactional record keeping for the third division 940 of the first entity 910. This transactional record keeping may be in the form of a blockchain 948. The computer user 952 of the second entity 950 may interact with the computing system 954 of the second entity 950 to perform transactional record keeping for the second entity 950. This transactional record keeping may also be in the form of a blockchain 958.

The blockchain network 960 of FIG. 5 comprises at least the blockchains 938, 948, 958. For the present example, the blockchain 948 of the third division 940 is also a principal blockchain 962 of the blockchain network 960. The blockchain 938 of the second division 930 is also an internal participating neighbor blockchain 964 of the blockchain network 960. The blockchain 958 of the second entity 950 is also an external participating neighbor blockchain 966 of the blockchain network 960. The terms "internal" and "external" are relative to the first entity 910 because both the principal blockchain 962 and the internal participating neighbor blockchain 964 are internal to the first entity 910 while the external participating neighbor blockchain 966 is external to the first entity 910.

The principal blockchain 962 and the internal participating neighbor blockchain 964 may communicate 968 to exchange block information for the purpose of cross-merklization. The communication 968 between the principal blockchain 962 and the internal participating neighbor blockchain 964 may occur in an environment of a private network having appropriate transmission security protocols. The principal blockchain 962 and the external participating neighbor blockchain 966 may communicate 970 to exchange block information for the purpose of cross-merklization. The communication 970 between the principal blockchain 962 and the external participating neighbor blockchain may occur in an environment of a public network having appropriate transmission security protocols.

In one embodiment, the transactional record keeping entries of the data store 926 of the first division 920 of the first entity 910 may be communicated 927 to, for example, the blockchain 948 of the third division 940 of the first entity 910. Communication 927 of the transactional record keeping from the data store 927 of the first division 920 to the blockchain 948 of the third division 940 may afford the same or nearly same degree of timely anomaly detection for the data store 926 of the first division 920 as for the blockchain 948 of the third division 940. The cross-merklization in the blockchain network 960 may serve to provide immutable record keeping and timely anomaly detection as described in the present disclosure for each participating blockchain 962 (948), 964 (938), 966 (958), and provide the same or nearly same degree of immutability and protection for the transactional record keeping of the data store 926.

Example Embodiments

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1

A system to detect an anomaly in a monitored computing system, the system comprising: a principal computing system implementing a principal blockchain to store record data in a principal series of blocks that are chronologically linked, each block of the principal series of blocks including a cryptographic hash of a previous block, a nonce for the cryptographic hash, a target difficulty for the cryptographic hash, a timestamp, and a portion of the record data, wherein the record data stored by the principal blockchain includes data of the monitored computing system; a first neighbor computing system in communication with the principal computing system and implementing a first participating neighbor blockchain comprising a series of blocks that are chronologically linked, each block of the series of blocks including a cryptographic hash of a previous block, a nonce for the cryptographic hash, a timestamp, and a portion of the record data, wherein the principal blockchain is to transmit to the first neighbor computing system the cryptographic hash, and the nonce for the cryptographic hash of a most recent principal block of the principal series of blocks, wherein the first participating neighbor blockchain is to receive the cryptographic hash and the nonce for the cryptographic hash of the most recent principal block and includes the cryptographic hash in a next block of the series of blocks, and wherein the first neighbor computing system detects an anomaly in the monitored computing system by determining whether a subsequent received cryptographic hash of a subsequent block of the principal blockchain is anomalous.

Example 2

The system of example 1, wherein the cryptographic hash comprises a binary hash tree, the final hash results from concatenation with a nonce to form an input string for a one-way cryptographic function, the output of which complies with a target difficulty that comprises a rule specifying a compliant cryptographic hash.

Example 3

The system of example 2, wherein the rule indicates a particular collection of one or more binary values in specified positions of the compliant cryptographic hash.

Example 4

The system of example 1, wherein the first participating neighbor blockchain transmits to the principal computing system the cryptographic hash and the nonce of a most recent block of the series of blocks, and wherein the principal blockchain receives the cryptographic hash and the nonce of the most recent block and includes it in a next principal block of the principal series of blocks.

Example 5

The system of example 4, further comprising: a second neighbor computing system implementing a second participating neighbor blockchain comprising a second series of blocks that are chronologically linked, each block of the second series of blocks including a cryptographic hash of a previous block, a nonce for the cryptographic hash, a timestamp, and a portion of the record data, wherein the principal blockchain transmits to the second neighbor computing system the cryptographic hash and the nonce of a most recent principal block of the principal series of blocks, wherein the first participating neighbor blockchain transmits to the second neighbor computing system the cryptographic hash the nonce for the cryptographic hash of a most recent block of the series of blocks, and wherein the second participating neighbor blockchain receives the cryptographic hash and the nonce for the cryptographic hash of the most recent principal block and includes the cryptographic hash in a next block of the second series of blocks and receives the cryptographic hash of the most recent block and includes the cryptographic hash in the next block of the second series of blocks.

Example 6

The system of example 1, wherein the detected anomaly is reported by the first neighbor computing system to the principal computing system to record occurrence of the anomaly.

Example 7

The system of example 1, wherein, upon the first neighbor computing system detecting the anomaly, the first participating neighbor blockchain and/or first neighbor computing system returns to the principal computing system a previous non-anomalous block received from the principal computing system.

Example 8

The system of example 1, wherein an anomaly comprises an incorrect cryptographic hash and/or incorrect cryptographic hash/nonce combination.

Example 9

The system of example 8, wherein the principal computing system, the first neighbor computing system, and a second neighbor computing system each, independently, verifies whether a shared cryptographic hash and/or cryptographic hash/nonce combination of each other computing system is/are correct or anomalous.

Example 10

The system of example 1, wherein the principal computing system is the monitored computing system.

Example 11

The system of example 1, wherein the principal computing system is distinct from the monitored computing system.

Example 12

The system of example 1, wherein the data of the monitored computing system comprises log data from logs maintained by the monitored computing system.

Example 13

The system of example 1, wherein the data of the monitored computing system comprises data stored by the monitored computing system.

Example 14

The system of example 1, wherein each computing system of the system, including the principal computing system and the first neighbor computing system, is a monitored computing system.

Example 15

An anomaly detection system to detect an anomaly in monitored data, the system comprising: a computing system implementing a participating blockchain, the computing system comprising: a communication interface to communicate with a principal computing system over a communication network, the principal computing system implementing a principal blockchain to store monitored data of a monitored computing system; a memory to store record data in a series of blocks of the participating blockchain, the series of blocks chronologically linked, each block of the series of blocks including a digest (e.g., a cryptographic hash) of a previous block, a nonce for the digest, a target difficulty for the digest, a timestamp, and a portion of the record data; one or more processors in electronic communication with the communication interface and the memory, the one or more processors to: implement a protocol of the participating blockchain, including adding blocks to the participating series of blocks; cross-merklize the participating blockchain with the principle blockchain by: receiving from the principal computing system, over the communication network via the communication interface, a digest and a nonce of a most recent block of the principal blockchain; and producing a next block of the series of blocks of the participating blockchain to include the digest of the most recent block of the principal blockchain; and detect an anomaly in the monitored data by determining whether a subsequent digest of a subsequent block of the principal blockchain is anomalous.

Example 16

The system of example 15, wherein the principal computing system is the monitored computing system.

Example 17

The system of example 15, wherein the one or more processors are further to cross-merklize the participating blockchain with the principle blockchain by transmitting to the principal computing system, over the communication network via the communication interface, the digest and the nonce for the digest of a most recent block of the series of blocks.

Example 18

The system of example 15, the communication interface further to communicate with one or more nodes also implementing the participating blockchain.

Example 19

The system of example 15, wherein detecting an anomaly in the monitored data comprises detecting one or more of an incorrect digest and an incorrect digest and nonce combination.

Example 20

An anomaly detection system to detect an anomaly in monitored data, the system comprising: a principal computing system implementing a principal blockchain, the principal computing system comprising: a communication interface to communicate with one or more neighbor computing systems over a communication network; a memory to store record data in a principal series of blocks of the principal blockchain, the principal series of blocks chronologically linked, each block of the principal series of blocks including a digest (cryptographic hash) of a previous block, a nonce for the digest, a target difficulty for the digest, a timestamp, and a portion of the record data, wherein the record data stored by the principal blockchain includes monitored data; one or more processors in electronic communication with the communication interface and the memory, the one or more processors to: implement a protocol of the principal blockchain, including adding blocks to the principal series of blocks; cross-merklize the principal blockchain with a first participating blockchain by: receiving from a first neighbor computing system implementing the first participating blockchain, over the communication network via the communication interface, a digest and a nonce of a most recent block of a series of chronologically linked blocks of the first participating blockchain; and creating a next principal block of the principal series of blocks to include the digest of the most recent block of the first participating blockchain; and detect an anomaly in the monitored data by determining whether a subsequent digest of a subsequent block of the principal blockchain is anomalous.

Example 21

The system of example 20, the communication interface further to communicate with one or more nodes also implementing the principal blockchain.

Example 22

The system of example 20, the one or more processors further to cross-merklize the principal blockchain with a first participating blockchain implemented on a first neighbor computing system by transmitting to the first neighbor computing system, over the communication network via the communication interface, the digest and the nonce for the digest of a most recent block of the principal series of blocks.

Example 23

The system of example 20, further comprising a first neighbor computing system in communication with the principal computing system and implementing the first participating blockchain, each block of the series of blocks including the digest of a previous block, a nonce for the digest, a timestamp, and a portion of the record data.

Example 24

A computer implemented method of detecting an anomaly in monitored data, the method comprising: receiving monitored data; storing the monitored data in record data in a new block of a principal series of blocks of a principal blockchain implemented on a principal computing system, the principal series of blocks chronologically linked, each block of the principal series of blocks including a digest of a previous block, a nonce for the digest, a timestamp, and a portion of the record data; transmitting (over a communication network via a communication interface) the digest and the nonce for the digest of the new block and of subsequent new blocks to a first participating blockchain being implemented on a first neighbor computing system; receiving at the first neighbor computing system the digest and the nonce of the new block and of subsequent new blocks; and detecting an anomaly in the monitored data by determining whether a subsequent digest of a subsequent new block of the principal blockchain is anomalous relative to the digest of an earlier block.

Example 25

A computer implemented method of detecting an anomaly in monitored data, the method comprising: receiving monitored data; storing the monitored data in record data in a new block of a principal series of blocks of a principal blockchain implemented on a principal computing system, the principal series of blocks chronologically linked, each block of the principal series of blocks including a digest of a previous block, a nonce for the digest, a timestamp, and a portion of the record data; transmitting a digest (and a nonce) of the new block to a participating blockchain being implemented on a neighbor computing system; receiving at the neighbor computing system the digest (and the nonce) of the new block; storing the received digest (and the received nonce) in the participating blockchain; transmitting a subsequent digest (and a subsequent nonce) of a subsequent new block of the principal series of blocks to the participating blockchain; receiving at the neighbor computing system the subsequent digest (and the subsequent nonce) of the subsequent new block; and detecting an anomaly in the monitored data by determining whether the subsequent digest of the subsequent new block is anomalous relative to the digest of the new block.

Example 26

The method of example 25, further comprising: transmitting a digest (and a nonce) of a new participating block of the participating blockchain to the principal blockchain; receiving at the principal computing system the digest (and the nonce) of the new participating block; storing the received digest (and the nonce) of the new participating block in the principal blockchain; detecting an anomaly in monitored data of the participating blockchain by determining whether a subsequent digest of a subsequent new participating block is anomalous relative to the digest of the new participating block.

The described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

Recitation in the claims of the term "first" with respect to a feature or element does not necessarily imply the existence of a second or additional such feature or element. Principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including instruction means which implement the function specified. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component (e.g., engine, system, subsystem) may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc., that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, the elements, materials and components, used in practice, which are particularly adapted for a specific environment and operating requirements, may be used without departing from the principles and scope of this disclosure. These and other changes or modifications are intended to be included within the scope of the present disclosure.

The scope of the present invention should, therefore, be determined only by the following claims.

The invention claimed is:

1. A system to detect an anomaly in monitored data, the system comprising:
a processor and memory to:
generate, based on a first digest that corresponds to a portion of monitored data at a first block of a principal blockchain that includes the monitored data, and based on a nonce compatible with the principal blockchain, a second digest that corresponds to the first block;
generate, based on a third digest that corresponds to the portion of the monitored data at a second block of a neighbor blockchain and the nonce, a fourth digest that corresponds to the second block;
generate a fifth digest as a merkle root by merklizing at least the second digest and the fourth digest, wherein the merklizing includes processing a single latest digest from the principal blockchain and a single latest digest from the neighbor blockchain together into a single merklized digest;
detect, in response to a determination that the second digest and the fourth digest both satisfy a sequence and that the fifth digest does not satisfy the sequence, an anomaly that corresponds to the portion of the monitored data and is associated with the first block and the second block; and
cause, in response to the detection of the anomaly, the principal blockchain to continue to produce one or more blocks subsequent to the first block and to continue to merklize digests of the principal blockchain and the neighbor blockchain.

2. The system of claim 1, the processor to:
detect, based on a determination that a sixth digest corresponding to the second block and based on the nonce and the second digest satisfies the sequence, an anomaly in the first block.

3. The system of claim 2, the principal blockchain located at a principal computing system, and the neighbor blockchain located at a neighbor computing system.

4. The system of claim 3, the processor to:
determine, by the principal computing system, whether the fifth digest satisfies the sequence; and
determine, by the neighbor computing system, whether the sixth digest satisfies the sequence.

5. The system of claim 1, the processor to:
link, by the fifth digest and in response to the determination that the second digest and the fourth digest satisfy the sequence, a third block with the first block; and
link, by the fifth digest and in response to the determination that the second digest and the fourth digest satisfy the sequence, the third block with the second block.

6. The system of claim 1, the processor to:
generate, based on the first digest and the third digest, a sixth digest corresponding to a third block of the principal blockchain.

7. The system of claim 1, the nonce based on a blockchain protocol compatible with one or more of the principal blockchain and the neighbor blockchain.

8. The system of claim 1, the processor to:
generate, by a one-way cryptographic process, the second digest; and generate, by the one-way cryptographic process, the fourth digest, the second digest corresponding to a first proof-of work (POW), and the fourth digest corresponding to a second POW.

9. The system of claim 1, the processor to:
modify, in response to the determination that the second digest and the fourth digest both satisfy the sequence, a third block to include the second digest, the fourth digest and the nonce.

10. A method to detect an anomaly in monitored data, the method comprising:
generating, based on a first digest corresponding to a portion of monitored data at a first block of a principal blockchain that includes the monitored data, and based on a nonce compatible with the principal blockchain, a second digest corresponding to the first block;
generating, based on a third digest corresponding to the portion of monitored data at a second block of a neighbor blockchain and the nonce, a fourth digest corresponding to the second block;
generating a fifth digest as a merkle root by merklizing at least the second digest and the fourth digest, wherein the merklizing includes processing a single latest digest from the principal blockchain and a single latest digest from the neighbor blockchain together into a single merklized digest;
detecting, in response to a determination that the second digest and the fourth digest both satisfy a sequence and that the fifth digest does not satisfy the sequence, an anomaly corresponding to the portion of the monitored data and associated with the first block and the second block; and
causing, in response to the detection of the anomaly, the principal blockchain to continue to produce one or more blocks subsequent to the first block and to continue to merklize digests of the principal blockchain and the neighbor blockchain.

11. The method of claim 10, further comprising:
detecting, based on a determination that a sixth digest corresponding to the second block and based on the nonce and the second digest satisfies the sequence, an anomaly in the first block.

12. The method of claim 11, the principal blockchain located at a principal computing system, and the neighbor blockchain located at a neighbor computing system.

13. The method of claim 12, further comprising:
determining, by the principal computing system, whether the fifth digest satisfies the sequence; and
determining, by the neighbor computing system, whether the sixth digest satisfies the sequence.

14. The method of claim 10, further comprising:
linking, by the fifth digest and in response to the determination that the second digest and the fourth digest satisfy the sequence, a third block with the first block; and
linking, by the fifth digest and in response to the determination that the second digest and the fourth digest satisfy the sequence, the third block with the second block.

15. The method of claim 10, further comprising:
generating, based on the first digest and the third digest, a sixth digest corresponding to a third block of the principal blockchain.

16. The method of claim 10, the nonce based on a blockchain protocol compatible with one or more of the principal blockchain and the neighbor blockchain.

17. The method of claim 10, further comprising:
generate, by a one-way cryptographic process, the second digest; and
generate, by the one-way cryptographic process, the fourth digest,
the second digest corresponding to a first proof-of work (POW), and the fourth digest corresponding to a second POW.

18. The method of claim 10, further comprising:
modify, in response to the determination that the second digest and the fourth digest both satisfy the sequence, a third block to include the second digest, the fourth digest and the nonce.

19. A non-transitory computer readable medium including one or more instructions stored thereon and executable by a processor to:
generate, by the processor and based on a first digest that corresponds to a portion of monitored data at a first block of a principal blockchain that includes the monitored data, and based on a nonce compatible with the principal blockchain, a second digest that corresponds to the first block;
generate, by the processor and based on a second digest that corresponds to the portion of the monitored data at a second block of a neighbor blockchain and the nonce, a fourth digest that corresponds to the second block;
generate, by the processor a fifth digest as a merkle root by merklizing at least the second digest and the fourth digest, wherein the merklizing includes processing a single latest digest from the principal blockchain and a single latest digest from the neighbor blockchain together into a single merklized digest;
detect, by the processor in response to a determination that the second digest and the fourth digest both satisfy a sequence and that the fifth digest does not satisfy the sequence, an anomaly that corresponds to the portion of the monitored data and is associated with the first block and the second block; and
cause, in response to the detection of the anomaly, the principal blockchain to continue to produce one or more blocks subsequent to the first block and to continue to merklize digests of the principal blockchain and the neighbor blockchain.

20. The non-transitory computer readable medium of claim 19, wherein the computer readable medium further includes one or more instructions executable by the processor to:
detect, by the processor and based on a determination that a sixth digest corresponding to the second block and based on the nonce and the second digest satisfies the sequence, an anomaly in the first block.

* * * * *